US011503121B2

(12) United States Patent
Kolhapure et al.

(10) Patent No.: US 11,503,121 B2
(45) Date of Patent: Nov. 15, 2022

(54) UNIVERSAL GATEWAY DEVICES, SYSTEMS AND METHODS FOR INTEGRATING PROPRIETARY PROTOCOLS WITH BMS SYSTEM

(71) Applicant: Johnson Controls Technology Company, Auburn Hills, MI (US)

(72) Inventors: Pramod Balbhim Kolhapure, Solapur (IN); Chetan Bidap, Pune (IN); Bakul Amit Tulankar, Pune (IN); Shawn D. Schubert, Oak Creek, WI (US); Eric G. Lang, Cedarburg, WI (US); Amarender Babu Kaveti, Waukesha, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 110 days.

(21) Appl. No.: 16/678,468

(22) Filed: Nov. 8, 2019

(65) Prior Publication Data
US 2021/0144210 A1    May 13, 2021

(51) Int. Cl.
| | |
|---|---|
| *H04L 29/08* | (2006.01) |
| *H04L 67/12* | (2022.01) |
| *H04L 69/18* | (2022.01) |
| *G06F 9/455* | (2018.01) |
| *H04L 41/082* | (2022.01) |
| *H04L 12/66* | (2006.01) |

(52) U.S. Cl.
CPC .............. *H04L 67/12* (2013.01); *G06F 9/455* (2013.01); *H04L 12/66* (2013.01); *H04L 41/082* (2013.01); *H04L 69/18* (2013.01)

(58) Field of Classification Search
CPC ....... H04L 67/12; H04L 41/082; H04L 69/18; H04L 12/66; G06F 9/455
See application file for complete search history.

(56) References Cited

U.S. PATENT DOCUMENTS

| | | | |
|---|---|---|---|
| 9,578,033 B2* | 2/2017 | Matthieu | H04W 4/70 |
| 10,193,981 B2* | 1/2019 | Cook | H04W 24/02 |
| 10,805,155 B1* | 10/2020 | Le | H04L 41/0893 |
| 2017/0094033 A1* | 3/2017 | Sathyadevan | H04L 69/03 |
| 2018/0062959 A1* | 3/2018 | Justin | H04L 41/5006 |
| 2018/0076978 A1 | 3/2018 | Schubert et al. | |
| 2018/0234519 A1* | 8/2018 | Boyapalle | H04L 41/0806 |

(Continued)

FOREIGN PATENT DOCUMENTS

WO     WO-2017040636 A1 *   3/2017   ............. H04L 69/08

*Primary Examiner* — Lan-Huong Truong
(74) *Attorney, Agent, or Firm* — Foley & Lardner LLP

(57) ABSTRACT

A universal gateway device includes a first network interface circuit and a second network interface circuit. The first network interface circuit is utilized to communicate over a first network associated with an Internet of Things (IoT) management system utilizing a first communications protocol. The second network interface circuit is utilized to communicate over a second network associated with an IoT device utilizing a second communications protocol that is different from the first communications protocol. The first network interface circuit generates a virtual device representation of the IoT device on the first network. The virtual device representation is utilized to communicate data from the IoT device over the first network utilizing the first communications protocol.

20 Claims, 9 Drawing Sheets

(56) References Cited

U.S. PATENT DOCUMENTS

| | | | |
|---|---|---|---|
| 2018/0287869 A1* | 10/2018 | Munafo | H04L 63/0853 |
| 2019/0020203 A1 | 1/2019 | Lang et al. | |
| 2019/0034235 A1* | 1/2019 | Yang | G06Q 50/26 |
| 2019/0098089 A1* | 3/2019 | Shim | H04L 69/08 |
| 2020/0162556 A1* | 5/2020 | Wood | H04L 29/08 |
| 2020/0358660 A1* | 11/2020 | Vecera | H04L 41/145 |
| 2020/0366563 A1* | 11/2020 | Patil | G06N 20/00 |
| 2021/0056430 A1* | 2/2021 | Wu | G06N 3/006 |
| 2021/0067605 A1* | 3/2021 | Roth | H04L 67/10 |

* cited by examiner

UNIVERSAL GATEWAY DEVICES, SYSTEMS AND METHODS FOR INTEGRATING PROPRIETARY PROTOCOLS WITH BMS SYSTEM

BACKGROUND

The present disclosure relates generally to IoT management platforms and systems. The present disclosure relates more particularly to universal gateway devices, systems, and methods for integrating disparate protocols.

The Internet of Things (IoT) is a network of interconnected objects (or Things), hereinafter referred to as IoT devices, that produce data through interaction with the environment and/or are controlled over a network. An IoT management platform is used by application developers to produce IoT applications for the IoT devices. Generally, IoT management platforms or systems are utilized to register and manage the IoT devices, gather and analyze data produced by the IoT devices, and provide recommendations or results based on the collected data. However, in many cases, IoT devices or subsystems may not easily interface with the IoT management platform or system. For example, where some of the IoT devices or subsystems are provided by third-parties, the third party IoT devices or subsystems may communicate via disparate or proprietary communication protocols, which may be incompatible with the IoT management platform or system. This inability to communicate with the IoT management platform or system using a communication protocol used or otherwise recognized by the IoT management platform or system can increase time to setup, commission, maintain, and/or monitor the third party IoT devices or subsystems. Further, these disparate or proprietary protocols are generally not published or disclosed by the third parties, which can limit the supply of control solutions to only those offered by the third parties. In this case, others are prevented from competing in this space to offer solutions with better design, functionality, and pricing.

As the number of IoT devices used in various sectors increases, the number of disparate or proprietary protocols used by the IoT devices have been increasing. Accordingly, devices, systems, and methods for integrating disparate or proprietary protocols may be desired.

SUMMARY

One implementation of the present disclosure is a universal gateway device including: a first network interface circuit configured to communicate over a first network associated with an Internet of Things (IoT) management system utilizing a first communications protocol; and a second network interface circuit configured to communicate over a second network associated with an IoT device utilizing a second communications protocol that is different from the first communications protocol, wherein the first network interface circuit is configured to generate a virtual device representation of the IoT device on the first network, the virtual device representation configured to communicate data from the IoT device over the first network utilizing the first communications protocol.

In some embodiments, the first network interface circuit may include a virtual network simulation module configured to communicate with the second network interface circuit to generate the virtual device representation of the IoT device.

In some embodiments, the second network interface circuit may be configured to: receive a data packet associated with the IoT device over the second communications protocol; store the data packet according to a data structure associated with the second communications protocol; and transmit the data packet to the virtual network simulation module.

In some embodiments, the virtual network simulation module may include a virtual network manager, and the virtual network manager may be configured to generate the virtual device representation based on the data packet received from the second network interface circuit.

In some embodiments, the virtual network manager may be configured to: generate a virtual device corresponding to the IoT device in a virtual device table based on the data packet, the virtual device having data objects corresponding to data points of the IoT device; receive a data value change associated with the IoT device from the second network interface circuit; and update one or more of the data objects based on the data value change.

In some embodiments, the virtual network manager may be configured to initially generate the virtual device to have an offline status, and in response to receiving the data value change, the virtual network manager may be configured to update the virtual device to have an online status.

In some embodiments, the virtual network manager may be configured to identify a device type or address from the data packet, and to generate the virtual device based on the device type or address.

In some embodiments, the second network interface circuit may be configured to: poll the IoT device to request data values for one or more of the data points of the IoT device; parse the data values to identify the data value change; and transmit the data value change to the virtual network manager.

In some embodiments, the first network interface circuit may include: a gateway executable module configured to detect the generation of the virtual device, and to expose the virtual device on the first network to appear as a field device on the first network, wherein the gateway executable module comprises a network layer configured to read data objects of the virtual device corresponding to data points of the IoT device to detect when the data objects are updated and to provide the updated data objects to the exposed virtual device on the first network.

In some embodiments, the second network may be associated with a plurality of IoT devices, and the first network interface circuit may be configured to generate the virtual device representation of the IoT device to include at least some data points from other devices of the plurality of IoT devices.

Another implementation of the present disclosure is an Internet of Things (IoT) management system including: an IoT management platform configured to communicate over a first network utilizing a first communications protocol, the first network comprising one or more devices associated with the first network; a second network comprising one or more IoT devices configured to communicate over the second network utilizing a second communications protocol that is different from the first communications protocol; and a universal gateway device including: a first network interface circuit configured to communicate over the first network utilizing the first communications protocol; and a second network interface circuit configured to communicate over the second network utilizing the second communications, wherein the first network interface circuit is configured to generate a virtual device representation of an IoT device from among the one or more IoT devices on the first network, the virtual device representation configured to communicate data from the IoT device over the first network utilizing the first communications protocol.

In some embodiments, the first network interface circuit may include a virtual network simulation module configured to communicate with the second network interface circuit to generate the virtual device representation of the IoT device.

In some embodiments, the second network interface circuit may be configured to: receive a data packet associated with the IoT device over the second communications protocol; store the data packet according to a data structure associated with the second communications protocol; and transmit the data packet to the virtual network simulation module.

In some embodiments, the virtual network simulation module may include a virtual network manager, and the virtual network manager may be configured to generate the virtual device representation based on the data packet received from the second network interface circuit.

In some embodiments, the virtual network manager may be configured to: generate a virtual device corresponding to the IoT device in a virtual device table based on the data packet, the virtual device having data objects corresponding to data points of the IoT device; receive a data value change associated with the IoT device from the second network interface circuit; and update one or more of the data objects based on the data value change.

In some embodiments, the virtual network manager may be configured to initially generate the virtual device to have an offline status, and in response to receiving the data value change, the virtual network manager is configured to update the virtual device to have an online status.

In some embodiments, the virtual network manager may be configured to identify a device type or address from the data packet, and to generate the virtual device based on the device type or address.

In some embodiments, the second network interface circuit may be configured to: poll the IoT device to request data values for one or more of the data points of the IoT device; parse the data values to identify the data value change; and transmit the data value change to the virtual network manager.

In some embodiments, the first network interface circuit may include a gateway executable module configured to detect the generation of the virtual device, and to expose the virtual device on the first network to appear as a field device on the first network, wherein the gateway executable module includes a network layer configured to read data objects of the virtual device corresponding to data points of the IoT device to detect when the data objects are updated and to provide the updated data objects to the exposed virtual device on the first network.

In some embodiments, the second network may include a plurality of IoT devices, and the first network interface circuit may be configured to generate the virtual device representation of the IoT device to include at least some data points from other devices of the plurality of IoT devices.

DETAILED DESCRIPTION

Hereinafter, example embodiments will be described in more detail with reference to the accompanying drawings.

Figure 1:
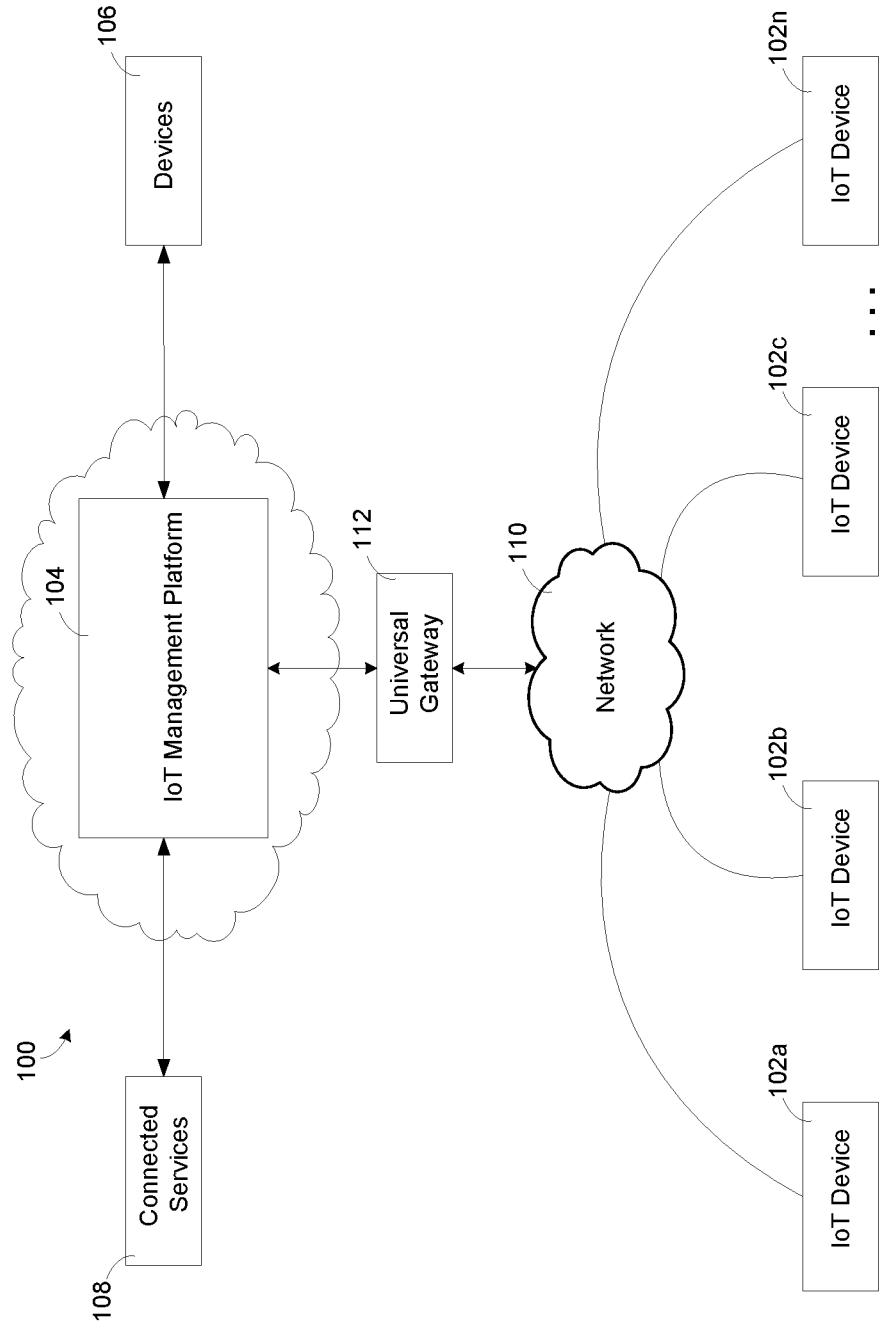
FIG. 1 is a system view illustrating an IoT environment including an IoT management platform in communication with various IoT devices via a universal gateway, according to some embodiments.

FIG. 1 is a block diagram of an IoT environment 100 according to some embodiments. The environment 100 is, in general, a network of connected devices configured to control, monitor, and/or manage equipment, sensors, and other devices in the IoT environment 100. The environment 100 may include, for example, a plurality of IoT devices 102*a*-102*n*, a cloud IoT management platform 104, one or more local devices 106, one or more connected services 108, a universal gateway 112, and any other equipment, applications, and devices that are capable of managing and/or performing various functions, or any combination thereof. Some examples of an IoT environment may include smart homes, smart buildings, smart cities, smart cars, smart medical implants, smart wearables, and the like.

The cloud IoT management platform 104 can be configured to collect data from a variety of different data sources. For example, the cloud IoT management platform 104 can collect data from the IoT devices 102*a*-102*n*, the local devices 106, the connected services 108, and/or other suitable external or internal services and devices. For example, IoT devices 102*a*-102*n* may include physical devices, sensors, actuators, electronics, vehicles, home appliances, wearables, smart speaker, mobile phones, mobile devices, medical devices and implants, and/or other Things that have network connectivity to enable the IoT devices 102 to communicate with the cloud IoT management platform 104 and/or be controlled over a network (e.g., a WAN, the Internet, a cellular network, and/or the like) 110. Further, the cloud IoT management platform 104 can be configured to collect data from a variety of external systems or services (e.g., 3rd party services). For example, some of the data collected from external systems or services may include weather data from a weather service, news data from a news service, documents and other document-related data from a document service, media (e.g., video, images, audio, social media, etc.) from a media service, and/or the like. While the devices described herein are generally referred to as IoT devices, it should be understood that, in various embodiments, the devices referenced in the present disclosure could be any type of devices capable of communicating data over an electronic network.

In some embodiments, IoT devices 102a-102n include sensors or sensor systems. For example, IoT devices 102a-102n may include acoustic sensors, sound sensors, vibration sensors, automotive or transportation sensors, chemical sensors, electric current sensors, electric voltage sensors, magnetic sensors, radio sensors, environment sensors, weather sensors, moisture sensors, humidity sensors, flow sensors, fluid velocity sensors, ionizing radiation sensors, subatomic particle sensors, navigation instruments, position sensors, angle sensors, displacement sensors, distance sensors, speed sensors, acceleration sensors, optical sensors, light sensors, imaging devices, photon sensors, pressure sensors, force sensors, density sensors, level sensors, thermal sensors, heat sensors, temperature sensors, proximity sensors, presence sensors, and/or any other type of sensors or sensing systems.

Examples of acoustic, sound, or vibration sensors include geophones, hydrophones, lace sensors, guitar pickups, microphones, and seismometers. Examples of automotive or transportation sensors include air flow meters, air-fuel ratio meters, AFR sensors, blind spot monitors, crankshaft position sensors, defect detectors, engine coolant temperature sensors, Hall effect sensors, knock sensors, map sensors, mass flow sensors, oxygen sensors, parking sensors, radar guns, speedometers, speed sensors, throttle position sensors, tire-pressure monitoring sensors, torque sensors, transmission fluid temperature sensors, turbine speed sensors, variable reluctance sensors, vehicle speed sensors, water sensors, and wheel speed sensors.

Examples of chemical sensors include breathalyzers, carbon dioxide sensors, carbon monoxide detectors, catalytic bead sensors, chemical field-effect transistors, chemiresistors, electrochemical gas sensors, electronic noses, electrolyte-insulator-semiconductor sensors, fluorescent chloride sensors, holographic sensors, hydrocarbon dew point analyzers, hydrogen sensors, hydrogen sulfide sensors, infrared point sensors, ion-selective electrodes, nondispersive infrared sensors, microwave chemistry sensors, nitrogen oxide sensors, olfactometers, optodes, oxygen sensors, ozone monitors, pellistors, pH glass electrodes, potentiometric sensors, redox electrodes, smoke detectors, and zinc oxide nanorod sensors.

Examples of electromagnetic sensors include current sensors, Daly detectors, electroscopes, electron multipliers, Faraday cups, galvanometers, Hall effect sensors, Hall probes, magnetic anomaly detectors, magnetometers, magnetoresistances, mems magnetic field sensors, metal detectors, planar hall sensors, radio direction finders, and voltage detectors.

Examples of environmental sensors include actinometers, air pollution sensors, bedwetting alarms, ceilometers, dew warnings, electrochemical gas sensors, fish counters, frequency domain sensors, gas detectors, hook gauge evaporimeters, humistors, hygrometers, leaf sensors, lysimeters, pyranometers, pyrgeometers, psychrometers, rain gauges, rain sensors, seismometers, SNOTEL sensors, snow gauges, soil moisture sensors, stream gauges, and tide gauges. Examples of flow and fluid velocity sensors include air flow meters, anemometers, flow sensors, gas meter, mass flow sensors, and water meters.

Examples of radiation and particle sensors include cloud chambers, Geiger counters, Geiger-Muller tubes, ionisation chambers, neutron detections, proportional counters, scintillation counters, semiconductor detectors, and thermoluminescent dosimeters. Examples of navigation instruments include air speed indicators, altimeters, attitude indicators, depth gauges, fluxgate compasses, gyroscopes, inertial navigation systems, inertial reference nits, magnetic compasses, MHD sensors, ring laser gyroscopes, turn coordinators, tialinx sensors, variometers, vibrating structure gyroscopes, and yaw rate sensors.

Examples of position, angle, displacement, distance, speed, and acceleration sensors include auxanometers, capacitive displacement sensors, capacitive sensing devices, flex sensors, free fall sensors, gravimeters, gyroscopic sensors, impact sensors, inclinometers, integrated circuit piezoelectric sensors, laser rangefinders, laser surface velocimeters, LIDAR sensors, linear encoders, linear variable differential transformers (LVDT), liquid capacitive inclinometers odometers, photoelectric sensors, piezoelectric accelerometers, position sensors, position sensitive devices, angular rate sensors, rotary encoders, rotary variable differential transformers, selsyns, shock detectors, shock data loggers, tilt sensors, tachometers, ultrasonic thickness gauges, variable reluctance sensors, and velocity receivers.

Examples of optical, light, imaging, and photon sensors include charge-coupled devices, CMOS sensors, colorimeters, contact image sensors, electro-optical sensors, flame detectors, infra-red sensors, kinetic inductance detectors, led as light sensors, light-addressable potentiometric sensors, Nichols radiometers, fiber optic sensors, optical position sensors, thermopile laser sensors, photodetectors, photodiodes, photomultiplier tubes, phototransistors, photoelectric sensors, photoionization detectors, photomultipliers, photoresistors, photoswitches, phototubes, scintillometers, Shack-Hartmann sensors, single-photon avalanche diodes, superconducting nanowire single-photon detectors, transition edge sensors, visible light photon counters, and wavefront sensors.

Examples of pressure sensors include barographs, barometers, boost gauges, bourdon gauges, hot filament ionization gauges, ionization gauges, McLeod gauges, oscillating u-tubes, permanent downhole gauges, piezometers, pirani gauges, pressure sensors, pressure gauges, tactile sensors, and time pressure gauges. Examples of force, density, and level sensors include bhangmeters, hydrometers, force gauge and force sensors, level sensors, load cells, magnetic level gauges, nuclear density gauges, piezocapacitive pressure sensors, piezoelectric sensors, strain gauges, torque sensors, and viscometers.

Examples of thermal, heat, and temperature sensors include bolometers, bimetallic strips, calorimeters, exhaust gas temperature gauges, flame detections, Gardon gauges, Golay cells, heat flux sensors, infrared thermometers, microbolometers, microwave radiometers, net radiometers, quartz thermometers, resistance thermometers, silicon bandgap temperature sensors, special sensor microwave/imagers, temperature gauges, thermistors, thermocouples, thermometers, and pyrometers. Examples of proximity and presence sensors include alarm sensors, Doppler radars, motion detectors, occupancy sensors, proximity sensors, passive infrared sensors, reed switches, stud finders, triangulation sensors, touch switches, and wired gloves.

In some embodiments, different sensors send measurements or other data to cloud IoT management platform 104 using a variety of different communications protocols or data formats. Cloud IoT management platform 104 can be configured to ingest sensor data received in any protocol or data format and translate the inbound sensor data into a common protocol or common data format. For example, in some embodiments, the cloud IoT management platform 104 operates over a local (or internal) network associated with the cloud IoT management platform 104. In some instances, the IoT devices 102 may operate over other networks (e.g., network 110) that may operate using protocols that are not compatible with the local (or internal) network associated with the cloud IoT management platform 104. Accordingly, in some embodiments, the universal gateway device 112 can interface between the local (or internal) network associated with the cloud IoT management platform 104 and the other network (e.g., network 110) to provide access to the local (or internal) network associated with the cloud IoT management platform 104 by the other network, and vice versa.

In some embodiments, the universal gateway 112 may create one or more virtualized devices associated with one or more IoT devices 102 on the other network 110. In some embodiments, the virtualized devices within the universal gateway 112 may appear as any other local devices 106 associated with the cloud IoT management platform 104, such that a controller or other device on the cloud IoT management platform 104 can simply interact with the virtual devices without requiring additional programming or configurations. In various embodiments, the virtual devices within the universal gateway 112 may be a composition or decomposition of the associated one or more IoT devices 102, such that additional intelligence can be added to the virtual devices prior to being presented over the local (or internal) network. For example, in some embodiments, a virtual device may be created to correspond to more than one IoT device 102, or to include data points from more than one IoT device 102. In another example, a virtual device may be created to correspond to less than all of the data points provided by a particular IoT device 102 or by more than one IoT device 102.

In some embodiments, the universal gateway 112 may generate, organize, or group virtual devices based on a common relationship between two or more IoT devices 102. For example, if the common relationship between two or more IoT devices 102 is a common space (e.g., room, floor, building, or the like), the universal gateway 112 may rationalize the common space relationship between the IoT devices 102 from the corresponding virtual devices, in order to intelligently group devices for organized visibility and control. For example, in some embodiments, the universal gateway 112 may leverage the common space relationship between the IoT devices 102 to group one or more virtual devices associated with the group of IoT devices 102 having the common space relationship. In another embodiment, the universal gateway 112 may generate one or more virtual devices that include one or more data points from each of the IoT devices 102 from the group having the common space relationship. Accordingly, data and controls associated with the group of IoT devices 102 having the common space relationship may be handled by the corresponding group of one or more virtual devices.

For example, still referring to FIG. 1, the cloud IoT management platform 104 may communicate with one or more local devices 106 and/or one or more connected services 108 over the local (or internal) network associated with the cloud IoT management platform 104. For example, in one embodiment, the local (or internal) network may be a Building Automation Control Network ("BACnet"), such as a Master Slave Token Passing (MSTP) BACnet network, a BACnetIP network, or any other suitable network or combination of networks. In other examples, the local (or internal) network may be any other suitable network, such as a local area network (LAN), a wireless local area network (WLAN), a campus area network (CAN), an EthernetIP network, or any other suitable network for controlling or communicating with the local devices 106 and/or the connected services 108 associated with the cloud IoT management platform 104.

In some embodiments, the local devices 106 may include any suitable device associated with the cloud IoT management platform 104, such as building equipment and devices. Example building equipment and devices may include air handling units (AHUs), variable air volume units (VAVs), rooftop air handling units (RTUs), controllers, actuators, chillers, sensors, security devices, access control devices, occupancy sensors, thermostats, lighting devices, audio/visual devices, and/or the like. In other examples, the local devices 106 may include any suitable IoT devices, as described above. In still other examples, the local devices 106 may include one or more human-machine interfaces or client interfaces (e.g., graphical user interfaces, reporting interfaces, text-based computer interfaces, client-facing web services, web servers that provide pages to web clients, and/or the like) for controlling, viewing, or otherwise interacting with the IoT environment 100, IoT devices 102, connected services 108, and/or the cloud IoT management platform 104. For example, the local devices 106 may include a computer workstation, a client terminal, a remote or local interface, a stationary terminal, a mobile device, and/or any other type of user interface device. For example, the local devices 106 may include a desktop computer, a computer server with a user interface, a laptop computer, a tablet, a smartphone, a PDA, or any other type of mobile or non-mobile device. The local devices 106 communicate with the cloud IoT management platform 104 and/or the connected services 108 over the local (or internal) network. In some embodiments, the connected services 108 may include one or more cloud-based services that can be accessed via the local (or internal) network. Example connected services 108 may include data analysis programs, cloud-based knowledgebases, or other suitable services. In some embodiments, the connected services 108 may include services allowing for a user to remotely access and interface the cloud IoT management platform 104, the local devices 106, and/or the IoT devices 102.

In some embodiments, the network 110, may provide communication between one or more IoT devices 102 and the cloud IoT management platform 104. Thus, the IoT devices 102 may be "non-local" (or "foreign") systems or devices with respect to the cloud IoT management platform 104. As used herein, the term "non-local" or "foreign" system or device is used to describe devices that do not natively communicate with the IoT management platform 104 via the local (or internal) network. For example, in some embodiments, the IoT devices 102 may communicate over one or more protocols that are different from those used by the cloud IoT management platform 104. Thus, the non-local devices and/or systems (e.g., the IoT devices 102) may require additional devices or software to interface with the local (or internal) network associated with the cloud IoT management platform 104.

In some embodiments, the network 110 may include one or more proprietary networks associated with the IoT devices and systems 102. In other examples, the network 110 may include a commonly used communication protocol that is distinct from that being used for the local (or internal) network of the cloud IoT management platform 104. For example, the network 110 may utilize an Internet protocol (IP), a transmission control protocol (e.g., TCP/IP), a user datagram protocol (UDP), a HyperText Transfer protocol (HTTP), an Internet Layer protocol (e.g., IPv6), a Bluetooth protocol, a ZigBee protocol, a Z-Wave protocol, a 6Low- PAN protocol, a Thread protocol, a Sigfox protocol, a Neul protocol, a LoRaWAN protocol, a cellular protocol, and/or other suitable protocols that are different from that used by the local (or internal) network of the cloud IoT management platform 104.

In some embodiments, the universal gateway 112 is configured to provide an interface between the local (or internal) network associated with the cloud IoT management platform 104 and the non-local network (e.g., network 110). For example, the universal gateway 112 may convert data transmitted over the network 110 into a compatible network protocol used by the cloud IoT management platform 104 (e.g., BACnet, LAN, WLAN, CAN, and/or the like) for use with the local (or internal) network. In one embodiment, the universal gateway 112 can read and write data to both the local (or internal) network and the non-local network (e.g., network 110). In some embodiments, the universal gateway 112 may further have a wireless radio for communicating with one or more user devices, such as mobile device. In some embodiments, a user accesses the universal gateway 112 via the user device, allowing the user access to the non-local network (e.g., network 110) and/or the local (or internal) network associated with the cloud IoT management platform 104. The universal gateway 112 will be described in further detail below.

In some embodiments, the cloud IoT management platform 104 generates data internally. For example, cloud IoT management platform 104 may include a web advertising system, a website traffic monitoring system, a web sales system, and/or other types of platform services that generate data. The data generated by cloud IoT management platform 104 can be collected, stored, and processed along with the data received from other data sources (e.g., the IoT devices 102, the local devices 106, and/or the like). In some embodiments, the cloud IoT management platform 104 can collect data directly from external systems or devices, via the local (or internal) network, and/or via the network 110. In various embodiments, the cloud IoT management platform 104 can process and transform the collected data, and may generate recommendations, control operations, alerts, notices, and/or the like based on the collected data. In some embodiments, the cloud IoT management platform 104 may learn from the collected data (e.g., via machine learning or data mining) to provide operational efficiencies for the IoT environment 100.

Cloud IoT Management Platform

Figure 2:
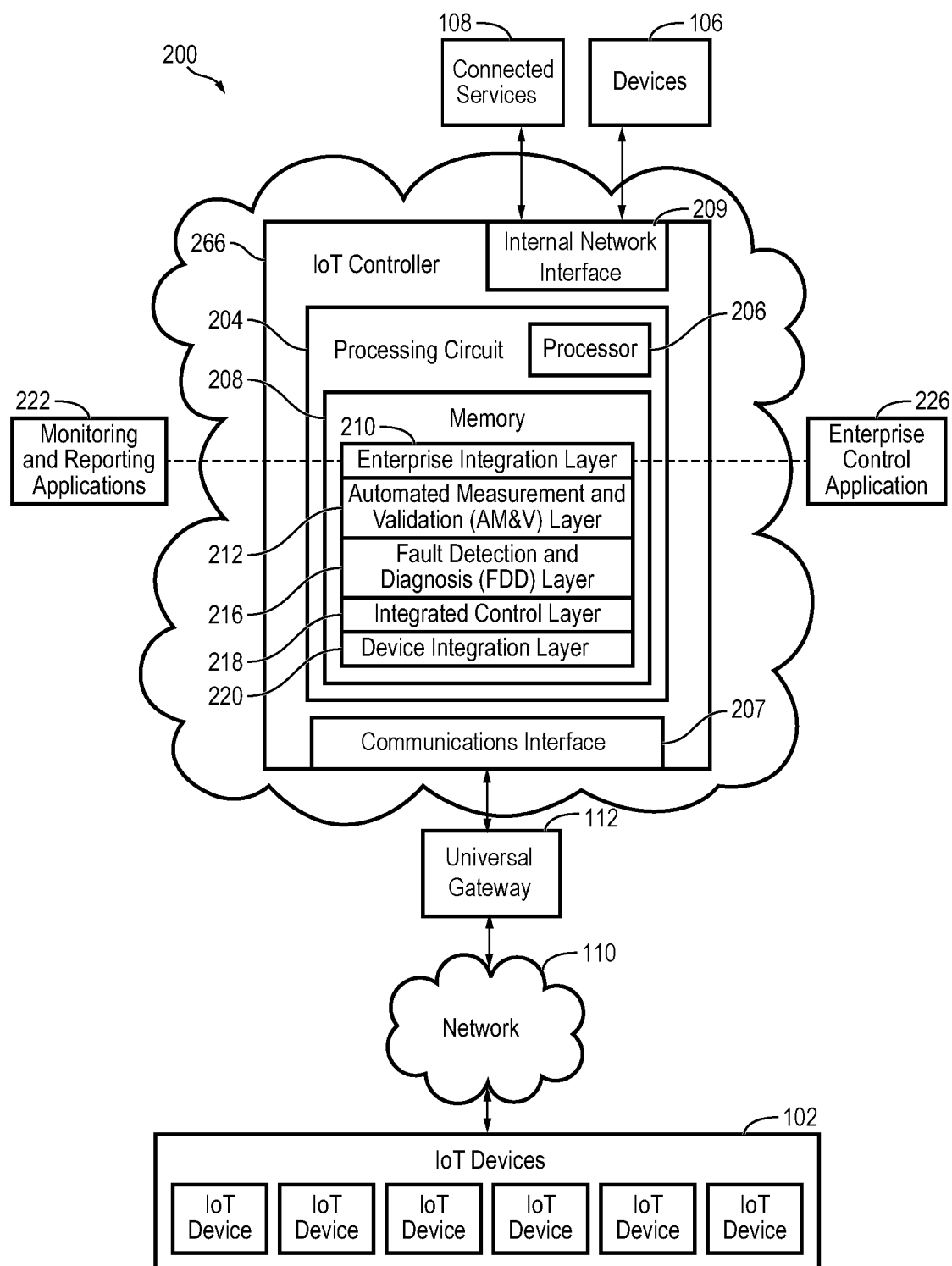
FIG. 2 is a schematic view illustrating an IoT management system in more detail, according to some embodiments.

Referring now to FIG. 2, a block diagram of a cloud IoT management system (IoTMS) 200 is shown, according to some embodiments. IoTMS 200 can be implemented in an IoT environment to automatically monitor and control various device functions. IoTMS 200 is shown to include a cloud IoT controller 266 and the universal gateway 112. In some embodiments, the cloud IoT controller 266 may correspond to a controller for the cloud IoT management platform 104 as described with reference to FIG. 1. In some embodiments, the universal gateway 112 is configured to provide an interface between IoT devices 102 and the cloud IoT management system 200, as described above. The IoT devices 102 are shown to include a plurality of IoT devices. However, the number of IoT devices is not limited to those shown in FIG. 2. Each of the IoT devices 102 may include any suitable device having network connectivity, such as, those discussed above with reference to FIG. 1. For example, in some embodiments, the IoT devices 102 may include a mobile phone, laptop, tablet, smart speaker, vehicle, appliance, light fixture, thermostat, wearable, medical implant, equipment, sensor, and/or the like. Further, each of the IoT devices 102 can include any number of devices, controllers, and connections for completing its individual functions and control activities. For example, any of the IoT devices 102 can be a system or subsystem of devices in itself including controllers, equipment, sensors, and/or the like.

cloud IoT controller 266 can include one or more computer systems (e.g., servers, supervisory controllers, subsystem controllers, etc.) that serve as system level controllers, application or data servers, head nodes, or master controllers of the IoT devices 102 and/or other controllable systems or devices in an IoT environment. cloud IoT controller 266 may include a communications interface 207 to communicate with multiple downstream IoT devices 102 and/or systems via the universal gateway 112 according to like or various disparate protocols, for example, such as one or more of the protocols discussed above with reference to FIG. 1.

In some embodiments, the IoT devices 102 receive information from cloud IoT controller 266 (e.g., commands, setpoints, operating boundaries, etc.) and provides data to cloud IoT controller 266 (e.g., measurements, valve or actuator positions, operating statuses, diagnostics, etc.) via the universal gateway 112. For example, the IoT devices 102 may provide the universal gateway 112 with data generated or otherwise collected by the IoT devices 102, for example, such as measurements from various sensors, equipment on/off states, equipment operating capacities, and/or any other information, that can be used by cloud IoT controller 266 to monitor or control a variable state or condition within the IoT environment, and the universal gateway 112 may provide the data to the IoT controller 266 for processing and analysis. In some embodiments, the universal gateway 112 may receive the data from the IoT devices 102 over a first protocol, and may provide the data to the IoT controller 266 over a second protocol different from the first protocol, and vice versa. The universal gateway 112 will be described in more detail with reference to FIGS. 3-8.

Still referring to FIG. 2, cloud IoT controller 266 is shown to include a communications interface 207 and an internal (or local) network interface 209. Interface 207 may facilitate communications between cloud IoT controller 266 and the IoT devices 102. Internal network interface 209 may facilitate communications between cloud IoT controller 266 and connected services 244 for allowing user control, monitoring, and adjustment to cloud IoT controller 266, IoT devices 102, or local devices 106. Interface 209 may also facilitate communications between cloud IoT controller 266 and local devices 106. As discussed above, one difference between the local devices 106 and IoT devices 102 is that the local devices 106 communicate with the cloud IoT controller 266 using a common or the same protocol, whereas the IoT devices 102 communicate with the cloud IoT controller 266 using one or more disparate protocols. In various embodiments, interfaces 207 and 209 may be the same interface, or may be separate interfaces.

Interfaces 207 and 209 can be or include wired or wireless communications interfaces (e.g., jacks, antennas, transmitters, receivers, transceivers, wire terminals, etc.) for conducting data communications with IoT devices 102, local devices 106, connected services 108, and/or other internal or external systems or devices. In various embodiments, communications via interfaces 207 and 209 can be direct (e.g., local wired or wireless communications) or via a communications network 110 (e.g., a WAN, the Internet, a cellular network, etc.). For example, interfaces 207 and 209 can include an Ethernet card and port for sending and receiving data via an Ethernet-based communications link or network. In another example, interfaces 207 and 209 can include a Wi-Fi transceiver for communicating via a wireless communications network. In another example, one or both of interfaces 207 and 209 can include cellular or mobile phone communications transceivers.

Still referring to FIG. 2, in various embodiments, cloud IoT controller 266 is implemented using a distributed or cloud computing environment with a plurality of processors and memory. That is, cloud IoT controller 266 can be distributed across multiple servers or computers (e.g., that can exist in distributed locations). For convenience of description, cloud IoT controller 266 is shown as including at least one processing circuit 204 including a processor 206 and memory 208. Processing circuit 204 can be communicably connected to communications interface 207 and/or internal network interface 209 such that processing circuit 204 and the various components thereof can send and receive data via interfaces 207 and 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to some embodiments, memory 208 is communicably connected to processor 206 via processing circuit 204 and includes computer code for executing (e.g., by processing circuit 204 and/or processor 206) one or more processes described herein.

However, the present disclosure is not limited thereto, and in some embodiments, cloud IoT controller 266 can be implemented within a single computer (e.g., one server, one housing, etc.). Further, while FIG. 2 shows monitoring and reporting applications 222 and enterprise control applications 226 as existing outside of cloud IoT controller 266, in some embodiments, applications 222 and 226 can be hosted within cloud IoT controller 266 (e.g., within memory 208).

Still referring to FIG. 2, memory 208 is shown to include an enterprise integration layer 210, an automated measurement and validation (AM&V) layer 212, a fault detection and diagnostics (FDD) layer 216, an integrated control layer 218, and an IoT device integration later 220. Layers 210-220 can be configured to receive inputs from IoT deices 228 and other data sources, determine optimal control actions for the IoT devices 228 based on the inputs, generate control signals based on the optimal control actions, and provide the generated control signals to IoT devices 228.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 may also or alternatively be configured to provide configuration GUIs for configuring cloud IoT controller 266. In yet other embodiments, enterprise control applications 226 can work with layers 210-220 to optimize the IoT environment based on inputs received at interface 207 and/or interface 209.

Device integration layer 220 can be configured to manage communications between cloud IoT controller 266 and the IoT devices 102 and/or local devices 106. For example, device integration layer 220 may receive sensor data and input signals from the IoT devices 102 via the universal gateway 112, and provide output data and control signals to the IoT devices 102 via the universal gateway 112. Device integration layer 220 may also be configured to manage communications between the IoT devices 102, the local devices 106, and/or between the IoT devices 102 and the local devices 106. In some embodiments, device integration layer 220 may translate communications (e.g., sensor data, input signals, output signals, etc.) across a plurality of multi-vendor/multi-protocol systems.

Integrated control layer 218 can be configured to use the data input or output of device integration layer 220 to make control decisions. For example, in some embodiments, due to the device integration provided by the device integration layer 220, integrated control layer 218 can integrate control activities of the IoT devices 102 such that the IoT devices 102 behave as a single integrated supersystem. In some embodiments, integrated control layer 218 includes control logic that uses inputs and outputs from a plurality of IoT device subsystems to provide insights that separate IoT device subsystems could not provide alone. For example, integrated control layer 218 can be configured to use an input from a first IoT device subsystem to make a control decision for a second IoT device subsystem. Results of these decisions can be communicated back to device integration layer 220.

Automated measurement and validation (AM&V) layer 212 can be configured to verify that control strategies commanded by integrated control layer 218 are working properly (e.g., using data aggregated by AM&V layer 212, integrated control layer 218, device integration layer 220, FDD layer 216, and/or the like). The calculations made by AM&V layer 212 can be based on IoT device data models and/or equipment models for individual IoT devices or subsystems. For example, AM&V layer 212 may compare a model-predicted output with an actual output from IoT devices 102 to determine an accuracy of the model.

Fault detection and diagnostics (FDD) layer 216 can be configured to provide on-going fault detection for the IoT devices 102, local devices 106, and subsystem devices (equipment, sensors, and the like), and control algorithms used by integrated control layer 218. FDD layer 216 may receive data inputs from integrated control layer 218, directly from one or more IoT devices or subsystems 102, or from another data source. FDD layer 216 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 216 can be configured to output a specific identification of the faulty component or cause of the fault (e.g., faulty device or sensor) using detailed subsystem inputs available at device integration layer 220. In other exemplary embodiments, FDD layer 216 is configured to provide "fault" events to integrated control layer 218 which executes control strategies and policies in response to the received fault events. According to some embodiments, FDD layer 216 (or a policy executed by an integrated control engine or business rules engine) may shut-down IoT systems, devices, and/or or components or direct control activities around faulty IoT systems, devices, and/or components to reduce waste, extend IoT device life, or to assure proper control response.

FDD layer 216 can be configured to store or access a variety of different system data stores (or data points for live data). FDD layer 216 may use some content of the data stores to identify faults at the IoT device or equipment level and other content to identify faults at component or subsystem levels. For example, the IoT devices 102 may generate temporal (i.e., time-series) data indicating the performance of IoTMS 200 and the various components thereof. The data generated by the IoT devices 102 can include measured or calculated values that exhibit statistical characteristics and provide information about how the corresponding system or IoT application process is performing in terms of error from its setpoint. These processes can be examined by FDD layer 216 to expose when the system begins to degrade in performance and alert a user to repair the fault before it becomes more severe.

Universal Gateway

The IoT management system 200 (or platform 104), as described above, operate over a local (or internal) network associated with the system 200. In some embodiments, one or more other networks may be used to communicate with the system 200, which are not compatible with the local (or internal) network. As described below, a universal gateway device can interface between the local (or internal) network and the other networks to provide access to the other networks by the local (or internal) network, and vice versa. In some embodiments, the universal gateway may generate one or more virtualized devices associated with one or more third-party devices (e.g., the IoT devices 102) on the other networks. In some embodiments, the virtualized devices within the universal gateway can be configured to appear as devices associated with the local (or internal) network such that a controller or other devices on the system 200 interacts with the virtual devices without requiring additional programming or configurations.

Figure 3:
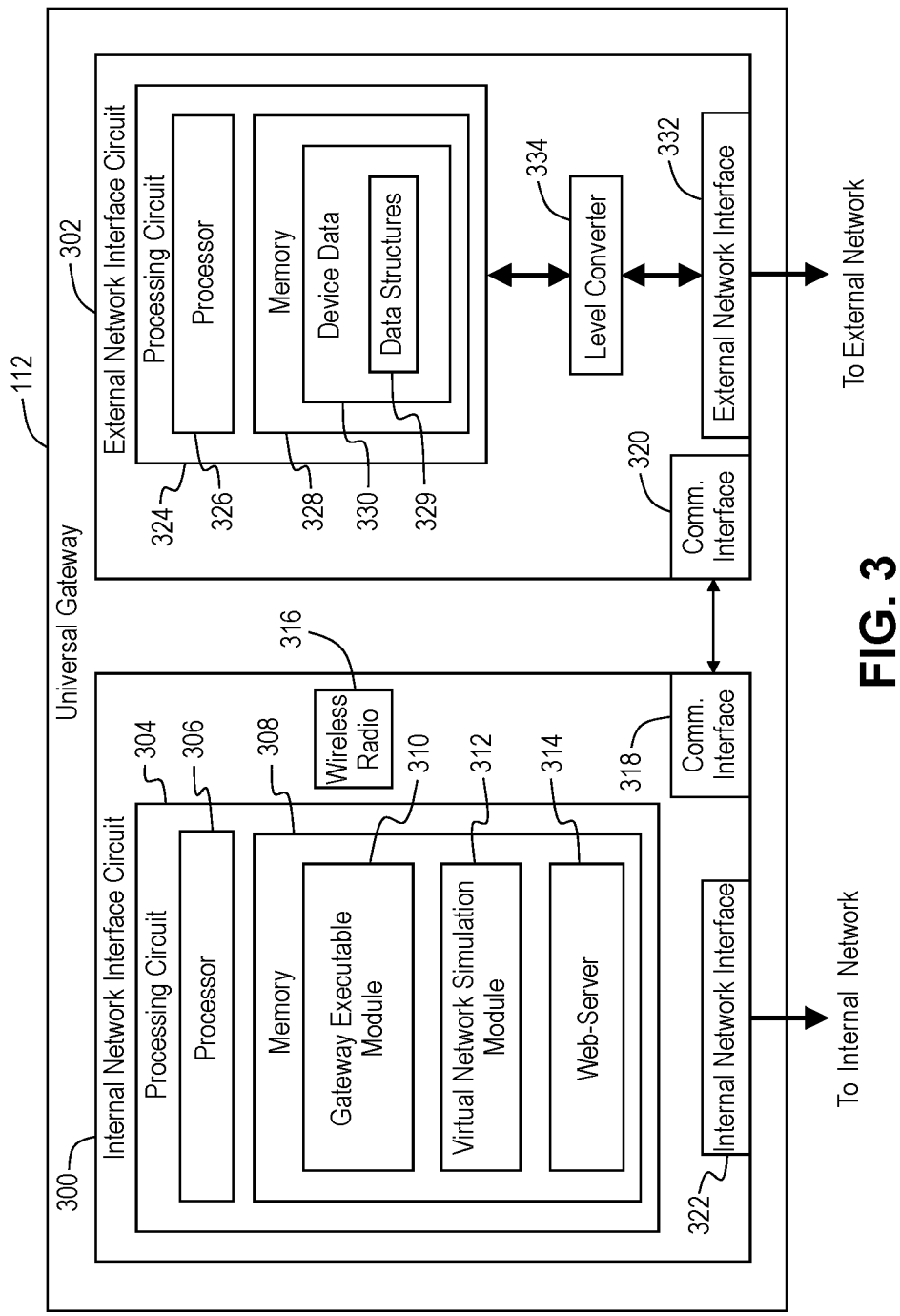
FIG. 3 is a schematic view illustrating a universal gateway device of FIG. 2, according to some embodiments.

For example, referring now to FIG. 3, an example of a universal gateway is shown in more detail, according to some embodiments. In various embodiments, universal gateway 112 may be a part of cloud IoT controller 266 (e.g., a part of communications interface 207) or may be a separate device. In some embodiments, universal gateway 112 may be implemented using a distributed or cloud computing environment with a plurality of processors and memory. That is, universal gateway 112 can be distributed across multiple servers or computers (e.g., that can exist in distributed locations). In other embodiments, universal gateway 112 may be implemented on a single or dedicated computing environment (e.g., one or more server systems).

In some embodiments, the universal gateway 112 includes an internal network interface circuit 300 for communicating with an internal network (e.g., local network associated with the system 200) and an external network interface circuit 302 for communicating with one or more external networks (e.g., non-local networks such as the network 110). The internal network interface circuit 300 includes a processing circuit 304. The processing circuit 304 includes a processor 306 and memory 308. The processor 306 may be a general purpose or specific purpose processor, an application specific integrated circuit (ASIC), one or more field programmable gate arrays (FPGAs), a group of processing components, or other suitable processing components. The processor 306 may be configured to execute computer code or instructions stored in the memory 308 or received from other computer readable media (e.g., CDROM, network storage, a remote server, etc.).

The memory 308 may include one or more devices (e.g., memory units, memory devices, storage devices, etc.) for storing data and/or computer code for completing and/or facilitating the various processes described in the present disclosure. The memory 308 may include random access memory (RAM), read-only memory (ROM), hard drive storage, temporary storage, non-volatile memory, flash memory, optical memory, or any other suitable memory for storing software objects and/or computer instructions. The memory 308 may include database components, object code components, script components, or any other type of information structure for supporting the various activities and information structures described in the present disclosure. The memory 308 may be communicably connected to the processor 306 via processing circuit 304 and may include computer code for executing (e.g., by processor 306) one or more processes described herein.

The memory 308 is shown to include a gateway executable module 310, a virtual network simulation module 312, and a webserver 314. The gateway executable module 310 includes the software modules required for operating the non-virtualized portion of the universal gateway 112. The gateway executable module 310 will be described in more detail below. The virtual network simulation module 312 includes the software modules required for operating the virtualized portion of the universal gateway 112, and will be described in more detail below.

The webserver 314 is configured to process and deliver web pages to a user. In one embodiment, the webserver 314 may be an HTTP webserver. The webserver 314 may be configured to deliver images, such as HTML documents to a user via a user device (e.g., a mobile device) associated with the user. The webserver 314 may support server-side scripting, Active Server Pages, or other scripting languages. The webserver 314 may further be configured to provide information or generate web-pages to devices in a local network. For example, the webserver 314 may be configured to provide web-pages to devices which are connected directly to the universal gateway 112, such as via wireless radio 316. In some embodiments, the webserver 314 can provide a web-portal for a user to access the universal gateway 112. In some embodiments, the user can access the universal gateway 112 via the user device by accessing the web-portal (e.g. website) generated by the webserver 314. In some embodiments, the web-portal provides basic information associated with the universal gateway 112, such as configuration data, network data, status, errors, etc. In further embodiments, the web-portal may allow the user to fully configure the universal gateway 112 via the user device. For example, the user may be able to connect the universal gateway 112 to both the local (or internal) network associated with the system 200 and the non-local network (e.g., network 110) via the web-portal. In still further embodiments, the user may be able to configure the one or more devices (e.g., the IoT devices 102) associated with the non-local network (e.g., network 110) via the web-portal. This can allow a user to quickly and easily configure the universal gateway 112 to provide the interface between the local (or internal) network and the non-local network 110.

In one embodiment, the internal network interface circuit 300 includes a wireless radio 316. In one embodiment, the wireless radio 316 is a Wi-Fi radio. The Wi-Fi radio can be configured to utilize service set identifier ("SSID") technology. SSID technology can be used such that only devices with specific access to the SSID associated with the universal gateway 112 will be allowed to access the data associated with the universal gateway 112 via the webserver 314. In other embodiments, the wireless radio 316 can be configured to utilize other security layers to restrict access to the universal gateway 112. For example, a user attempting to access the universal gateway 112 via the wireless radio 316 may be required to provide a user name and password before being allowed access. In still further examples, the user may be required to maintain an identity token on the user device used to access the universal gateway 112 via the wireless radio 316, such that the user is required to present the token to the universal gateway 112 to obtain access. While the wireless radio 316 is described above in relation to a Wi-Fi radio, the wireless radio 316 may utilize other wireless communication protocols, for example, such as Wi-Max, ZigBee, LoRA, Bluetooth, NFC, cellular (3G, 4G, LTE, CDMA), RF, IR, or other suitable wireless communication protocols.

The internal network interface circuit 300 further includes a communication interface 318. The communication interface 318 is configured to communicate with a second communication interface 320 located on the external network interface circuit 302. In one embodiment, the communication interfaces 318, 320 are serial communication interfaces, such as USB. In other examples, the communication interfaces 318, 320 may be other suitable kinds of serial interfaces, for example, such as RS-232, RS-485, or other suitable serial communication interfaces. The internal network interface circuit 300 may further include an internal network interface 322. The internal network interface 322 can provide communication to and from the local (or internal) network associated with system 200. For example, the internal network interface 322 may be a BACnet interface, a LAN interface, a WLAN interface, a CAN interface, an EthernetIP network interface, or any other suitable network interface.

The external network interface circuit 302 can also include a processing circuit 324. The processing circuit 324 is in communication with the communication interface 320 for communicating with the internal network interface circuit 300. The processing circuit 324 includes a processor 326 and memory 328. The processor 326 may be a general purpose or specific purpose processor, an application specific integrated circuit (ASIC), one or more field programmable gate arrays (FPGAs), a group of processing components, or other suitable processing components. The processor 326 may be configured to execute computer code or instructions stored in the memory 328 or received from other computer readable media (e.g., CDROM, network storage, a remote server, etc.). In some embodiments, processing circuits 304 and 324 can be the same processing circuit.

The memory 328 may include one or more devices (e.g., memory units, memory devices, storage devices, etc.) for storing data and/or computer code for completing and/or facilitating the various processes described in the present disclosure. The memory 328 may include random access memory (RAM), read-only memory (ROM), hard drive storage, temporary storage, non-volatile memory, flash memory, optical memory, or any other suitable memory for storing software objects and/or computer instructions. The memory 328 may include database components, object code components, script components, or any other type of information structure for supporting the various activities and information structures described in the present disclosure. The memory 328 may be communicably connected to the processor 326 via processing circuit 324 and may include computer code for executing (e.g., by processor 326) one or more processes described herein.

The memory 328 may include a device data module 330. The device data module 330 may be used to store data related to devices (e.g., IoT devices 102) associated with the external network (e.g., non-local network such as network 110). Example data may include data points, device address, device names, device types, device status, data point values, and/or the like. In one embodiment, the external network interface circuit 302 is configured to interface with the external network. The external network interface circuit 302 may interface with the external network (or non-local network) via an external network interface 332. In some embodiments, the external network interface circuit 302 may further include a level converter 334. The level converter 334 may be used where the signal levels on the external network (or non-local network) are not compatible with the processing circuit 324. In some embodiments, the level converter 334 is integral to the external network interface 332. In examples where the external network interface circuit 302 has a level converter 334, the level converter 334 may provide communication between the processing circuit 324 and the external network interface 332. In other embodiments where the level converter 334 is not used, the processing circuit 324 interacts directly with the external network interface 332 to access the external network (or non-local network).

Figure 4:
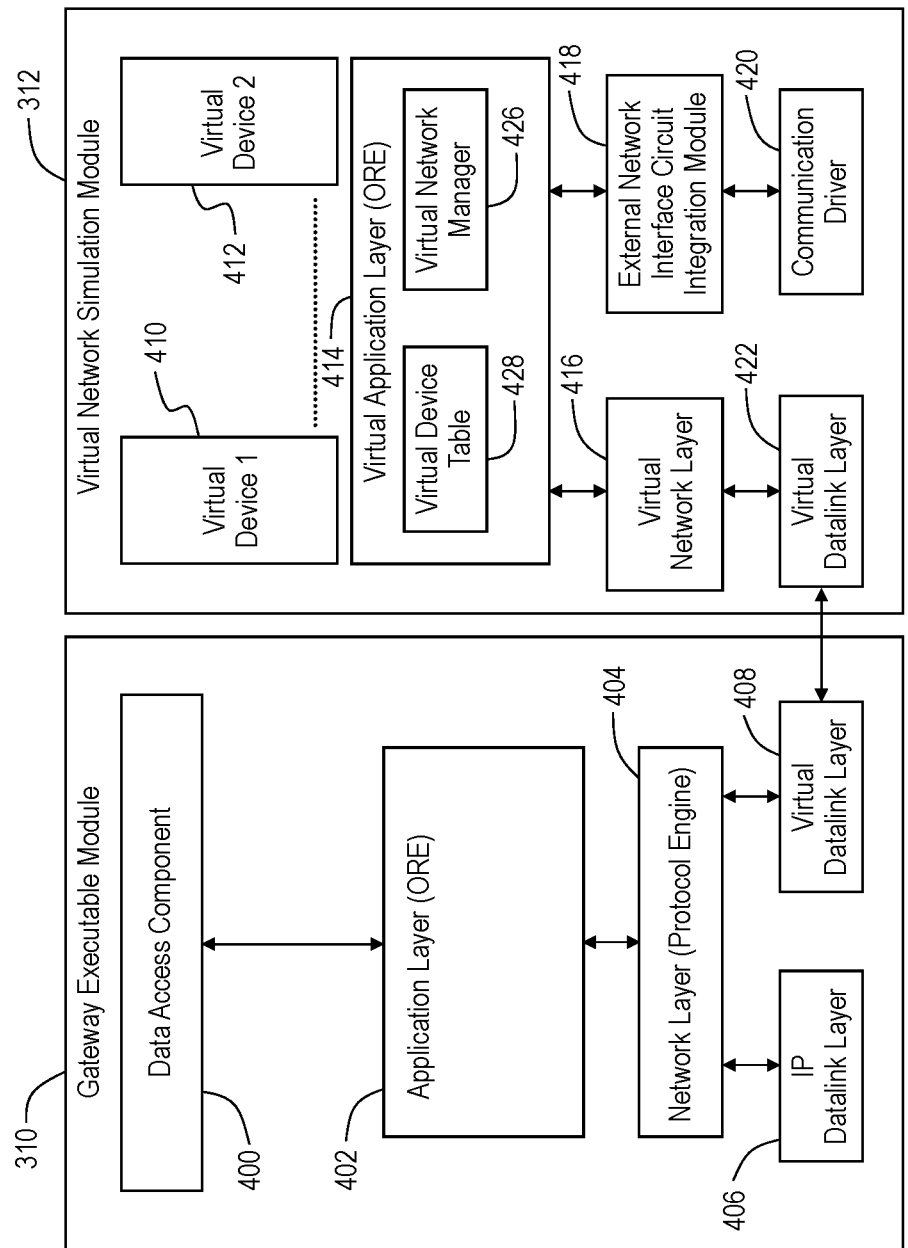
FIG. 4 is an interface diagram illustrating the interaction between the gateway executable module and the virtual network simulation module of FIG. 3, according to some embodiments.

Referring now to FIG. 4 an interface diagram showing an interaction between the gateway executable module 310 and the virtual network simulation module 312 of the internal network interface circuit in FIG. 3 is shown, according to some embodiments. As shown in FIG. 4, the gateway executable module 310 can include a data access component 400, an application layer (ORE) 402, a network layer (protocol engine) 404, an IP datalink layer 406, and a virtual datalink layer 408. The virtual network simulation module 312 is shown to include a first virtual device 410 and a second virtual device 412. While only two virtual devices 410 and 412 are shown, it is contemplated that multiple virtual devices may be located within the virtual simulation module 312, each corresponding to one or more of the IoT devices 102. For example, in one embodiment, the virtual network simulation module 312 may include up to two-hundred virtual devices. However, in other embodiments, the virtual network simulation module 312 may include more than two-hundred virtual devices or less than two-hundred virtual devices. The virtual network simulation module 312 may further include a virtual application layer (ORE) 414, a virtual network layer 416, an external network interface circuit integration module 418, a communication driver 420, and a virtual datalink layer 422.

The data access component 400 of the gateway executable module 310 is configured to access data within the virtual devices 410 and 412 in the virtual network simulation module 312. In one embodiment, the data access component 400 is configured to store one or more poll mappers that are configured to poll the virtual devices 410 and 412 to obtain the desired data. The data access component 400 may further be configured to communicate the data from the virtual devices 410 and 412 to the application layer (ORE) 402. In one example, the data access component 400 is a Multi-Touch Gateway UI Data Access Component. In other embodiments, the data access component 400 is a Mobile Access Portal. However, other data access component types are contemplated as well. In some embodiments, the data access component is configured to interface with the one or more virtual devices 410 and 412.

The application layer (ORE) 402 may be configured to convert data received from the data access component 400 into data readable by the devices and systems (e.g., the cloud IoT control 266, the local devices 106, and/or the like) associated with the local (or internal) network of system 200. The network layer 404 may convert the data from the virtual devices 410 and 412 into a format for use on the local (or internal) network. For example, in the case where the local (or internal) network is BACnet network, the network layer 404 may map the data from the virtual devices 410 and 412 into one or more device objects as BACnet readable data objects. The BACnet data objects may then be configured such that they are readable and/or writable by devices associated with the local (or internal) network. Further, the network layer 404 may be configured to map data received from the local (or internal) network to the one or more virtual devices 410 and 412. The data mapped to the one or more virtual devices 410 and 412 can then be passed on to the associated non-local devices (e.g., IoT devices 102).

The network layer 404 can modify the data stored in the one or more virtual devices 410 and 412 to be presented over the local (or internal) network. For example, in some embodiments, the network layer 404 modifies the data stored in the virtual devices 410 and 412 for transmission over the local (or internal network) using one or more suitable protocols (e.g., such as those described with reference to FIGS. 1-3) associated with the local (or internal) network. Similarly, the network layer 404 can convert data received via the local (or internal network) into data that can be mapped to the one or more virtual devices 410 and 412. The IP datalink layer 406 is configured to access an IP based network. For example, where the local (or internal) network is an IP based network (e.g., TCP/IP, BACnet/IP, and/or the like), the IP datalink layer 406 may package and transmit the data modified by the network layer 404 over the IP based network. The virtual datalink layer 408 may be configured to receive and transmit data to the virtual network simulation module 312. In one embodiment, the virtual datalink layer 408 communicates with the virtual network simulation module 312 via the virtual data link layer 422.

The virtual network simulation module 312 may communicate with the external network (e.g., the non-local network 110) via the communication driver 420. In one embodiment, the communication driver 420 is a USB driver for communicating with the external network interface circuit 302. In other examples, the communication driver 420 may be other types of serial data drivers, such as RS-232, RS-485, and/or the like. In some examples, the communication driver 420 may be a proprietary serial communication driver, for example, such as an H-Link communication driver from Hitachi. In some embodiments, the communication driver 420 can be in communication with the communication interface 318 for communicating with the communication interface 320 of the external network interface circuit 302. The communication driver 420 is further in communication with the external network interface circuit integration module 418. The external network interface circuit integration module 418 is configured to translate the data from the external network interface circuit 302, for use in the virtual network simulation module 312. For example, the external network interface circuit integration module 418 may be configured to parse the data received via the communication driver 420 into various data points (e.g., individual data points). For example, in various embodiments, the external network interface circuit integration module 418 may parse the received data by data type, device type, device address, and/or the like. The external network interface circuit integration module 418 can then provide the parsed data to the virtual application layer 414.

In some embodiments, the virtual application layer 414 may include a virtual network manager 426. In one embodiment, the virtual network manager 426 is responsible for creation and management of virtual devices 410 and 412, as well as read and write operations to and from the virtual devices 410 and 412. In some embodiments, the virtual network manager 426 may be configured to create a virtual network based on the data received from the external network interface circuit integration module 418. For example, if the external network interface circuit integration module 418 provides data from multiple non-local devices or systems (e.g., IoT devices 102), the virtual network manager 426 can create virtual devices associated with the received data. For example, the virtual devices 410 and 412 may be created by the virtual network manager 426, as will be described in more detail below. The virtual application layer 414 can further take the data provided by the external network interface circuit integration module 418, and working with the virtual network manager 426, modify the received data to be compatible with the local (or internal) network associated with system 200. For example, by populating the virtual devices 410 and 412 with data objects, the virtual devices 410 and 412 can be read by the network layer 404 as individual devices, similar to the local devices 106 on the local (or internal) network. An example virtual device is illustrated in FIG. 5, and will be discussed in greater detail below.

In some embodiments, the virtual application layer 414 can be configured to map the received data into a virtual device table 428. In one embodiment, the virtual device table 428 may be populated with data related to one or more of the virtual devices 410 and 412. In one embodiment, the virtual device table 428 may be configured to represent a list of virtual objects, such as virtual BACnet objects, but other data object types are contemplated. In one embodiment, the virtual device table 428 is modified for each virtual device 410 and 412 created by the virtual network manager 426. The virtual device table 428 may further provide mapping between the virtual devices 410 and 412 and the associated non-local devices (e.g., the IoT devices 102).

In some embodiments, the virtual network layer 416 is configured to modify the data stored in the one or more virtual devices 410 and 412 to be presented over the local (or internal) network. In one embodiment, the virtual network layer 416 modifies the data stored in the virtual data objects represented by the virtual devices table 428 for transmission over the local (or internal) network using one or more suitable protocols that are used by the local (or internal) network, for example, such as any of those discussed above with reference to FIGS. 1-3. However, other network protocols are also contemplated. The virtual datalink layer 422 may be configured to receive and transmit data to the gateway executable module 310. For example, in one embodiment, the virtual datalink layer 422 communicates with the gateway executable module 310 via the virtual data link layer 408.

Figure 5:
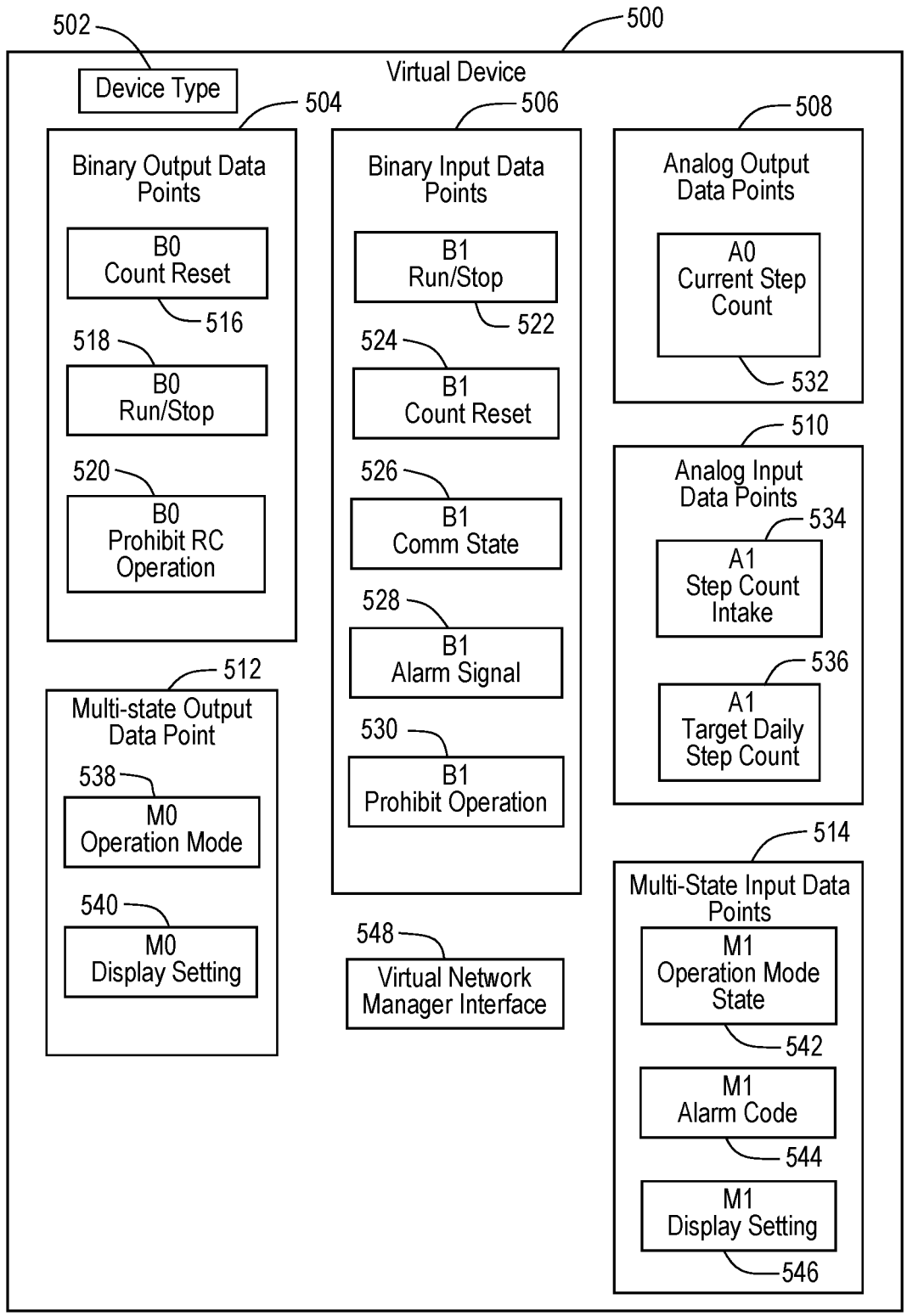
FIG. 5 is a detailed view of a virtual device, according to some embodiments.

Turning now to FIG. 5 a detailed view of a virtual device 500 is shown, according to some embodiments. In some embodiments, the virtual device 500 may be similar to or the same as any one of the virtual devices 410 and 412 described above. For example, in some embodiments, the virtual device 400 is a virtual representation of a non-local or foreign device (e.g., an IoT device 102) presented as a local device 106 to the local (or internal) network associated with the cloud IoT management platform 104. In some embodiments, the virtual device 500 is generated by the virtual network manager 426 based on data received via the external network (e.g., the non-local network 110) associated with the non-local devices (e.g., the IoT devices 102). In some embodiments, the virtual device 500 includes a number of data points corresponding to actual data points of the non-local devices or systems (e.g., the IoT devices 102). For example, in one embodiment, the virtual device 500 includes a device type data point 502. In some embodiments, the device type data point 502 may include data corresponding to a type of device that the virtual device 500 is representing. For example, the device type data point 502 may indicate that the virtual device 500 represents a particular type of IoT device 102, various examples of which are discussed with reference to FIGS. 1-4.

In some embodiments, the virtual device 500 may further include various other data points. For example, the other data points may include binary output data points 504, binary input data points 506, analog output data points 508, analog input data points 510, multi-state outputs 512, multi-state inputs 514, and/or the like. However, the present disclosure is not limited thereto, and additional, fewer, or other data points are contemplated that may be associated with the virtual device 500 depending on the type of non-local or foreign device (e.g., IoT device 102) that the virtual device 500 is representing. Further, while FIG. 5 shows that the virtual device 500 is generated to include multiple data points from a single non-local or foreign device (e.g., IoT device 102), the present disclosure is not limited thereto, and in various embodiments, the virtual device 500 may include less than all data points from the single non-local or foreign device, a combination of data points from multiple non-local or foreign devices, a combination of data points from non-local and local devices, a logical combination of data points from various devices having a common relationship, and/or the like.

For a non-limiting example, as shown in FIG. 5, the virtual device 500 may represent an activity tracker, such as a smart pedometer. In this case, in some non-limiting examples, the binary output data points 504 may include binary data points such as a (step) count reset 516, a run-stop signal 518, and a prohibit RC operation signal 520. In some non-limiting examples, the binary input data points 506 may include binary input data points such as a run/stop input 522, a (step) count reset 524, a communication state 526, an alarm signal 528, and a prohibit operation input 530. In some non-limiting examples, the analog output data points 508 may include a current step count data point 532. In some non-limiting examples, the analog input data points 510 may include a step count intake input 534 and a target daily step count input 536. In some non-limiting examples, the multi-state output data points 512 may include an operation mode output 538 and a display setting output 540. In some non-limiting examples, the multi-state input data points 514 may include data points such as an operation mode state input 542, an alarm code 544, and a display setting input 546. It should be understood that the above described data points are provided only as an example in the context of a smart pedometer, and thus, other data points are contemplated depending on the type of device.

In some embodiments, the virtual device 500 may further include a virtual network manager interface 548. The virtual network manager interface 548 is configured to interface with the virtual network manager 426. The virtual network manager interface 548 can receive data point values, device type information, device status information, and other information related to an associated non-local or foreign device (e.g., IoT device 102) via the virtual network manager 426. In some embodiments, the virtual network manager interface 548 is configured to communicate values received via the data access component 400 to the virtual network manager 426. The virtual network manager interface 548 can then provide the new values to the associated non-local or foreign device. In some embodiments, the virtual network manager interface 548 emulates multiple network devices based on devices listed the virtual device table 428. For example, in some embodiments, a 'Who-Is' request may be answered with an 'I Am' response from multiple network devices with unique virtual MAC addresses. In some embodiments, the virtual network manager interface 548 can emulate the non-local or foreign devices listed in the virtual device table 428 as one of the local devices 106.

Figure 6:
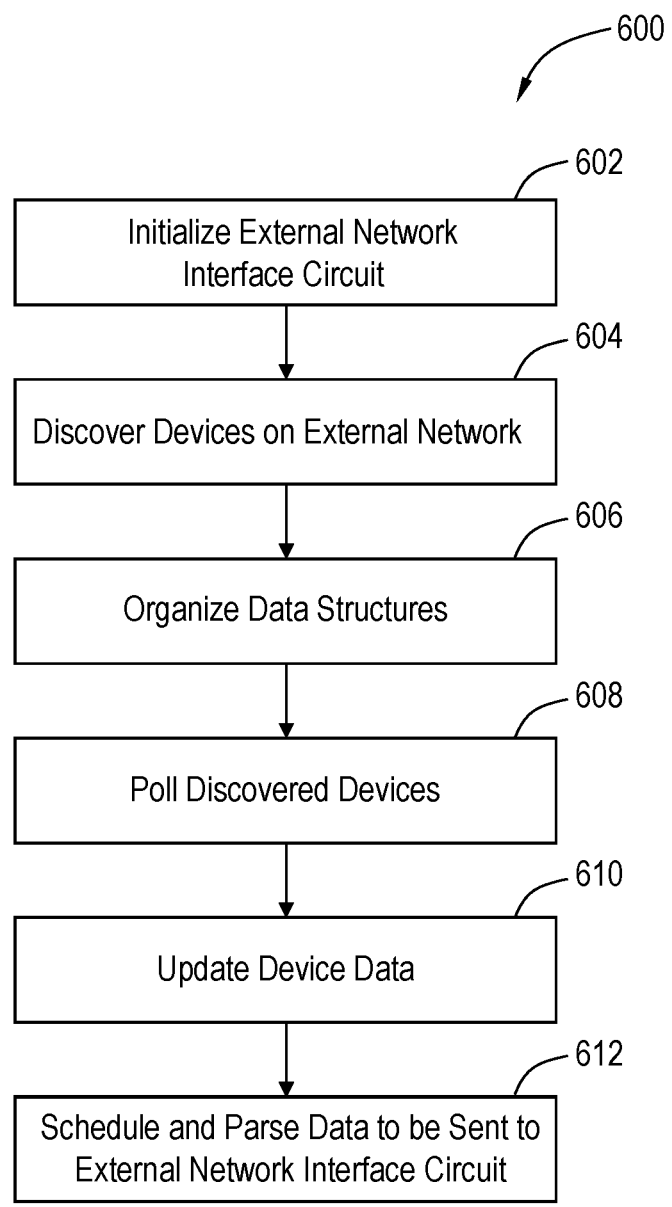
FIG. 6 is a flow chart illustrating a process for interfacing with a non-local or foreign network using a universal gateway device, according to some embodiments.

Turning now to FIG. 6, a process 600 for interfacing with an external network using the universal gateway 112 is shown, according to some embodiments. At process block 602, the external network interface circuit 302 is initialized. At process block 604, the external network interface circuit 302 communicates with the non-local or foreign network (e.g., network 110) to discover all devices and/or subsystems on the non-local network 110. In one example, the external network interface circuit 302 communicates with the non-local network 110 via the external network interface 332. At process block 606, the data from the discovered devices is organized into data structures 329 by the external network interface circuit 302. In one embodiment, the data structures 329 may be stored in one or more data tables, for example, such as data structures 329. In one embodiment, the data tables are stored in the device data module 330. The data tables may be configured to store data structures 329 for each discovered non-local or foreign device (e.g., IoT device 102). The data structures 329 can be unique to each discovered device. In some embodiments, the data structures 329 may be partially constructed by the processing circuit 324 of the external network interface circuit 302. For example, the data structures 329 may be partially constructed based on the detected device type. By receiving the device type, a data structure 329 can be constructed by the processing circuit 324 to reflect the usual message content received from the device. In some embodiments, the device data may include metadata identifying the current running state and any configuration settings used by the non-local or foreign device (e.g., IoT device 102). The data structures 329 may be formatted to provide for easier consumption by devices associated with the local (or internal) network associated with the cloud IoT management platform 104 or system 200, such as cloud IoT controller 266 and/or local devices 106. For example, the data structures may be formatted using standard device and point names as used in the local (or internal) network (e.g., associated with a protocol or network used by the local network). Additional examples may include common or standard graphics or other templates. This can reduce the time required for installation and configuration of devices and subsystems (e.g., IoT devices 102) associated with the non-local or foreign network 110. Further, by formatting the data structures 329 to be compatible with the local (or internal) network, non-intelligent devices (e.g., valves, actuators, and/or the like) can communicate with the cloud IoT management platform 104 or system 200 via a common data model. The common data model may include intelligence that allows one or more controllers or other local devices 106 to recognize or identify non-local or foreign devices or subsystems (e.g., IoT devices 102) with minimal effort.

At process block 608, the discovered devices can be polled to obtain values for one or more data points associated with the discovered devices. For example, in one embodiment, the external network interface circuit 302 performs the polling. In one embodiment, the polling may be conducted immediately upon the data structures being organized and setup at process block 606. In other embodiments, the polling may be conducted at regular intervals to ensure that the device data is current. In some embodiments, once the discovered devices have been polled, the device data structures are updated at process block 610. At process block 612, the external network interface circuit 302 schedules and parses the data to be sent to the internal network interface circuit 300.

Figure 7:
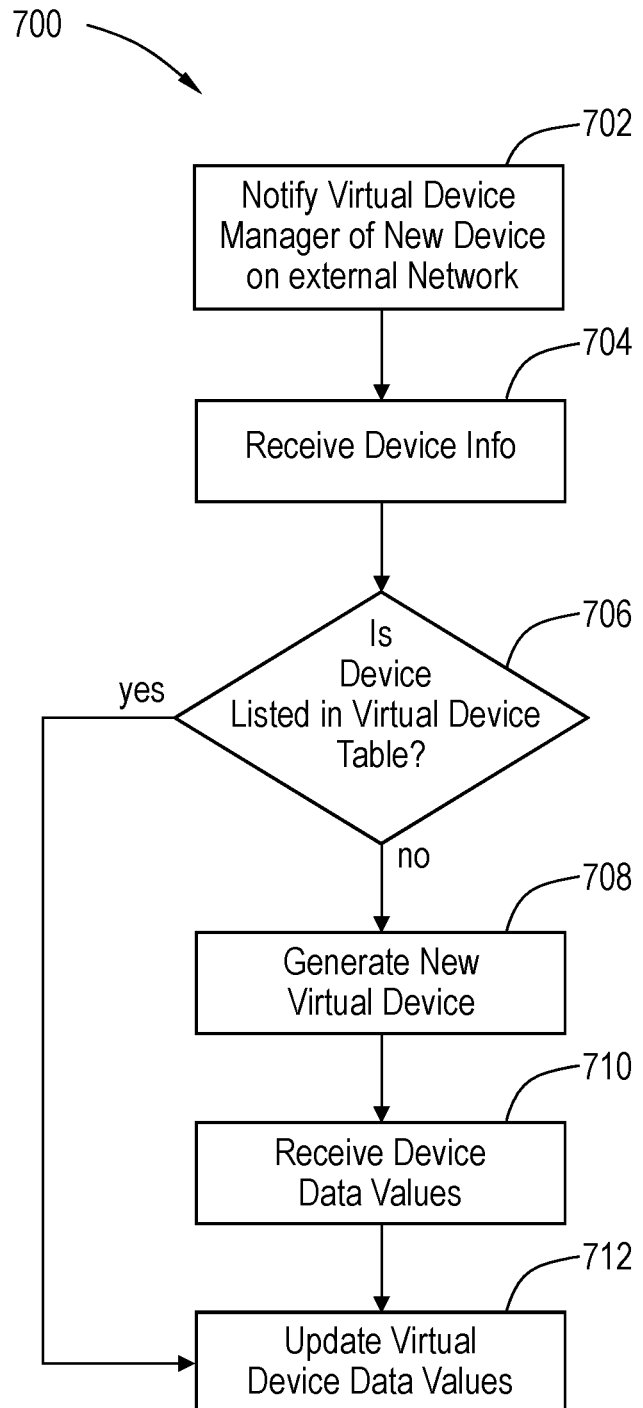
FIG. 7 is a flow chart illustrating a process for generating one or more virtual devices, according to some embodiments.

Referring now to FIG. 7, a process 700 for generating one or more virtual devices is shown, according to some embodiments. At process block 702, the virtual network manager 426 is notified that a device has been detected on the external network 110. In one embodiment, the notification is performed by the external network interface circuit 302. In one example, the notification may be in the form of a data packet sent to the virtual network manager 426. In some embodiments, the indication may include an address and/or device type of the newly discovered device. Once the notification has been provided to the virtual network manager 426, data associated with the new device can be provided to the virtual network manager 426. In one embodiment, the data is provided by the external network interface circuit 302. The data may contain a unique MAC address associated with the device. Further, the received data may include information related to the device type. For example, the information related to the device type may indicate whether the device is a mobile device or a stationary device. In other embodiments, the unique MAC address may be associated with the type of device. For example, the prefix or suffix of the MAC address may be associated with specific device types.

At process block 706, the virtual network manager 426 determines if the device is currently listed in the virtual device table 428. For example, in one embodiment, the virtual network manager 426 determines if the received unique MAC address is currently listed in the virtual device table 428. However, in other embodiments, the virtual network manager 426 may evaluate other criteria to determine if the device is listed in the virtual device table 428, for example, such as a unique device identifier. If the device is a known device (e.g., yes at process block 706), the virtual device data objects for the device may be updated with the received data values at process block 712. On the other hand, if the device is not currently listed in the virtual device table 428 (e.g., no at process block 706), the virtual network manager 426 will generate a new virtual device at process block 708. In one embodiment, the virtual network manager 426 may generate the virtual device based on the type of device associated with the device type. In other embodiments, the virtual network manager 426 may generate the virtual device based on the unique MAC address of the device. In some examples, the virtual network manager 426 may have access to a database having data points provided by different data types. The virtual network manager 426 can then utilize the database to generate virtual devices having the proper data points and/or other parameters. In some embodiments, the virtual network manager 426 may initially set up the virtual device as an "offline" device. In this case, in some embodiments, the virtual device may remain as an offline device until additional data is received.

At process block 710, data value changes can be received by the virtual network manager 426. In some embodiments, receiving data values associated with the virtual device prompts the virtual network manager 426 to configure the virtual device to be "online." In one embodiment, the virtual network manager 426 passively waits to receive data values related to the virtual device. In other embodiments, the virtual network manager 426 may be configured to request updated data values associated with the virtual device from the external network interface circuit 302. At process block 712, the virtual device data objects may be updated with the received data values.

Figure 8:
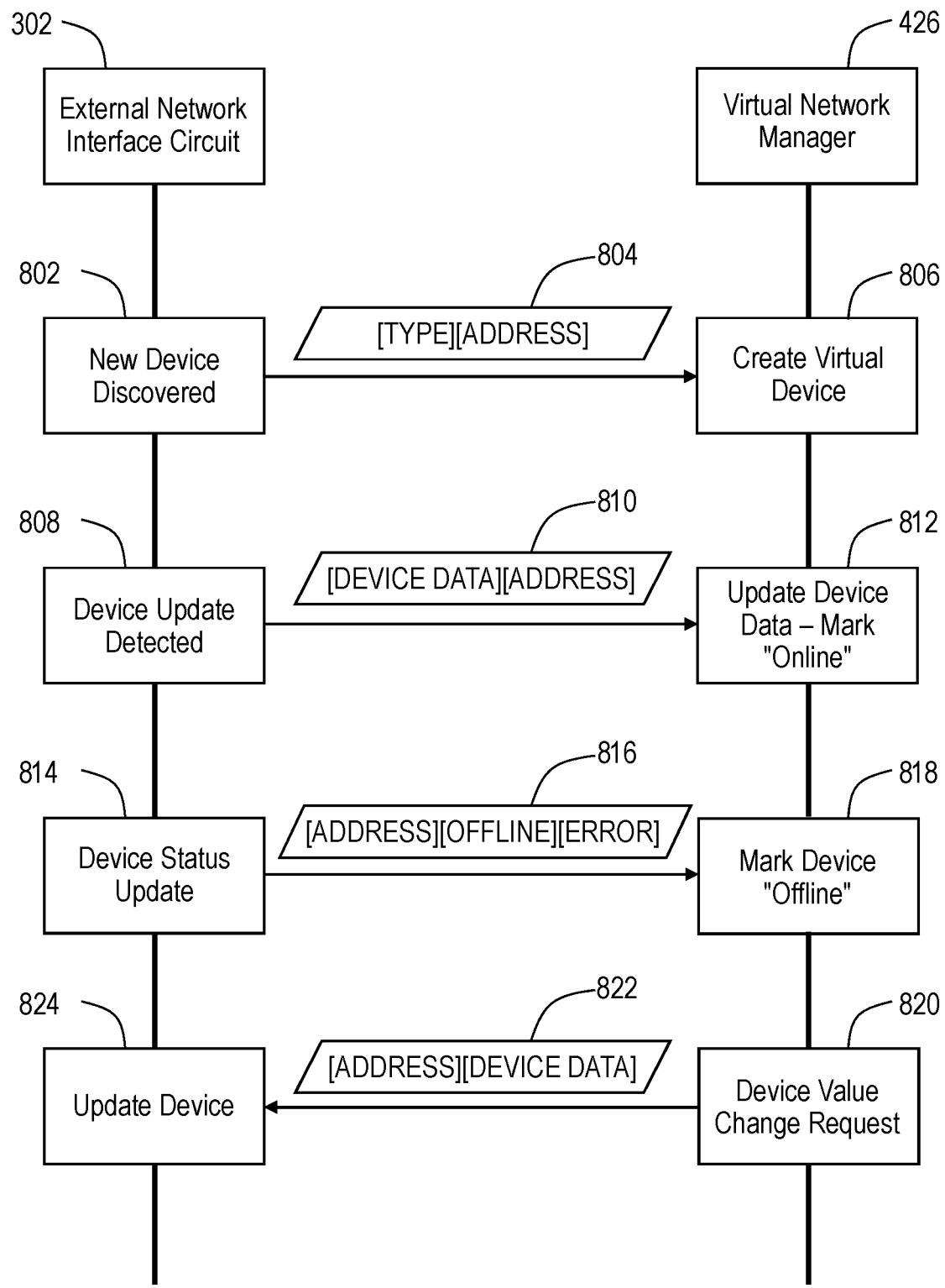
FIG. 8 is a flow chart illustrating an interface process between an external network interface circuit and a virtual network manager, according to some embodiments.

Turning now to FIG. 8, an illustration of an interface process between the external network interface circuit 302 and the virtual network manager 426 is shown, according to some embodiments. At process block 802, a new device is discovered as described above with reference to FIG. 6. The external network interface circuit 302 then transmits data packet 804 to the virtual network manager 426. In one embodiment, the data packet 804 includes a TYPE data message and an ADDRESS data message. However, other data messages are contemplated. The TYPE data message may refer to the device type. For example, the TYPE data message may indicate whether the detected discovered device is a mobile device or a stationary device. In other examples, the TYPE data message may relate to a specific device type, such as whether the device is a smart speaker, smart thermostat, smart car, or the like, for example. The ADDRESS data message may be an address associated with the discovered device. In one embodiment, the ADDRESS data message is a unique MAC address supplied by the external network interface circuit 302. The virtual network manager 426 may then receive the data packet 804 and create a virtual device at process block 806. In one embodiment, the virtual network manager 426 creates the virtual device as described above with reference to FIG. 7.

At process block 808 a device value change associated with one or more non-local or foreign devices (e.g., IoT devices 102) is detected by the external network interface circuit 302. The external network interface circuit 302 then transmits data packet 810 to the virtual network manager 426. In one embodiment, the data packet 810 includes a DEVICE DATA data message and an ADDRESS data message. In one embodiment, the DEVICE DATA data message is a structure containing all of the data whose values are determined by the external network interface circuit 302. Accordingly, the DEVICE DATA data message may vary depending on the device type it is associated with. The ADDRESS data message may be an address associated with the discovered device. In one embodiment, the ADDRESS data message is a unique MAC address supplied by the external network interface circuit 302. The virtual network manager 426 may then receive the data packet 810 and update the virtual device at process block 812. In some embodiments, the virtual network manager 426 may also modify the virtual device to indicate that it is "Online" after receiving updated data if the virtual device was previously indicated as "Offline."

At process block 814, a device status update is detected by the external network interface circuit 302. The external network interface circuit 302 then transmits data packet 816 to the virtual network manager 426. In one embodiment, the data packet 816 includes an ADDRESS data message, and OFFLINE data message, and an ERROR data message. The ADDRESS data message may be an address associated with the device having a status update. In one embodiment, the ADDRESS data message is a unique MAC address supplied by the external network interface circuit 302. The OFFLINE data message may be a binary signal indicating that the device has gone offline. In other embodiments, the OFFLINE data message may be any other type of signal indicating that the device has gone offline. The ERROR data message may indicate an error on the device. In some embodiments, the ERROR data message is an enumeration of possible error conditions for the non-local or foreign device (e.g., IoT device 102). The virtual network manager 426 may then receive the data packet 816 and update the virtual device at process block 818. In some embodiments, the virtual network manager 426 may also modify the virtual device to indicate that it is "Offline." In some embodiments, the virtual network manager 426 may generate a flag to indicate that an error has occurred.

At process block 820, the virtual network manager 426 initiates a virtual device value change request. The value change request may indicate a desired modification to a parameter of one or more non-local or foreign devices (e.g., IoT devices 102). For example, the virtual network manager 426 may receive a request to change a value of a virtual device via the local or internal network, for example, such as from the cloud IoT controller 266, one or more of the local devices 106, and/or the like. Once the virtual device value change request has been initiated at process block 820, the virtual network manager 426 then transmits a data packet 822 to the external network interface circuit 302. In one embodiment, the data packet 822 includes an ADDRESS data message and a DEVICE DATA data message. The ADDRESS data message may be an address associated with the virtual device that the virtual network manager 426 requires the value to change. In one embodiment, the ADDRESS data message is a unique MAC address supplied by the external network interface circuit 302. In one embodiment, the DEVICE DATA data message is a structure containing all of the data whose values are to be modified by the external network interface circuit 302. The external network interface circuit 302 may then receive the data packet 822 and update the associated non-local or foreign device (e.g., IoT device 102) at process block 824.

Figure 9:
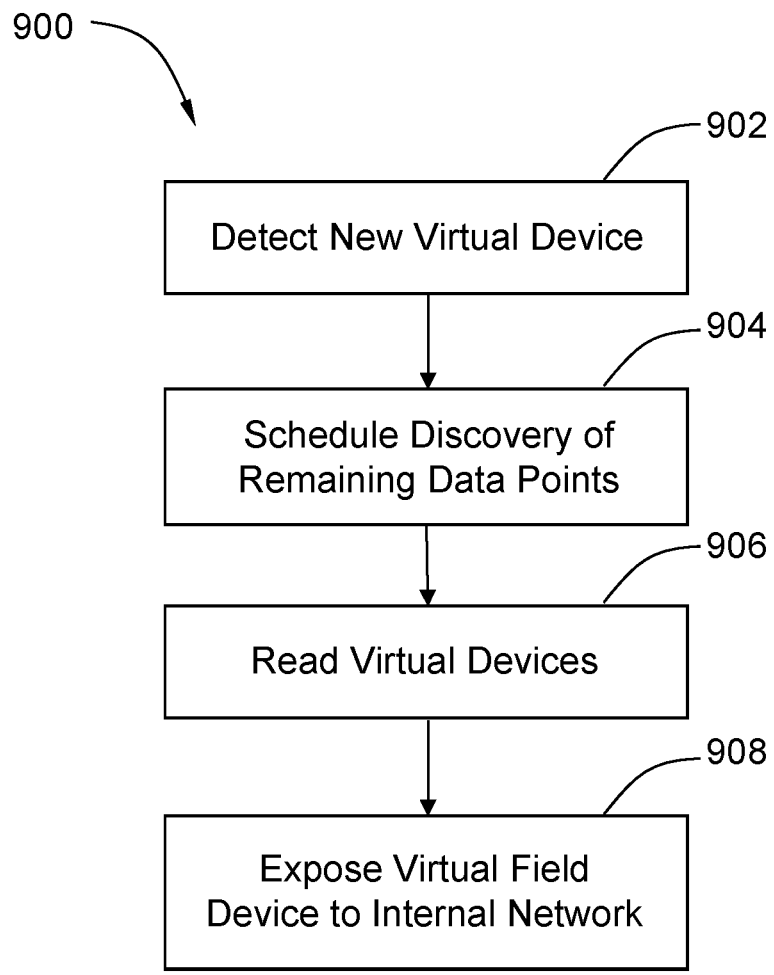
FIG. 9 is a flow chart illustrating a process for exposing virtual devices to a local or internal network, according to some embodiments.

Referring now to FIG. 9, a process 900 for exposing virtual devices to a local (or internal) network is shown, according to some embodiments. At process block 902, the gateway executable module 310 detects that one or more new virtual devices have been generated (or added). In one embodiment, the gateway executable module 310 may determine that a new virtual device has been generated by monitoring an active node table (e.g., the virtual device list 428). In one embodiment, the active node table may be stored within the memory 308 of the internal network interface circuit 300. The active node table may change as new virtual devices are added to the virtual network via the virtual network manager 426. In some embodiments, the virtual network manager 426 is configured to update the active node table when a new device is added. In other embodiments, the virtual network manager 426 may provide a signal gateway executable module when a new virtual device is added to the virtual device list 428.

At process block 904, discovery of the remaining data points are scheduled. In one embodiment, the virtual application layer 414 schedules the discovery of the remaining data points. The remaining data points may be those data points within the virtual devices 410 and 412 that have yet to be received from the field devices (e.g., IoT devices 102) associated with the virtual devices. At process block 906, the network layer 404 may read the new virtual devices 410 and 412. The network layer 404 may receive a signal indicating that the virtual devices 410 and 412 have been created or that values associated with the virtual devices 410 and 412 have changed. At process block 908 the virtual devices 410 and 412 are exposed to the local (or internal) network by the network layer 404. Exposing the virtual devices 410 and 412 to the internal network allows for devices or services on the internal network to see (e.g., discover and/or communicate with) the virtual devices 410 and 412 as field devices (e.g., local devices 106) associated with the internal network. In some embodiments, the virtual devices 410 and 412 are configured to appear as standard local devices 106 to the internal network.

According to various example embodiments, the universal gateway 112, using the methods described above, may present the non-local or foreign devices (e.g., IoT devices 102) to the cloud IoT management platform 104 or system 200, such that the non-local or foreign devices (e.g., IoT devices 102) appear the same as any other local device 106 on the local (or internal) network. Similarly, in various embodiments, the universal gateway 112 provides data generated by the non-local or foreign devices (e.g., IoT devices 102) to the cloud IoT management platform 104 or system 200, such that the data appears to be generated as it would be by any other local devices 106 on the local (or internal) network. On the other hand, in various embodiments, the universal gateway 112 presents data and control signals from the local (or internal) network to the non-local or foreign devices (e.g., IoT devices 102) according to a format recognized by the non-local or foreign devices (e.g., IoT devices 102). Accordingly, in various embodiments, the universal gateway 112 provides seamless integration among foreign networks utilizing disparate protocols to communicate among each other without requiring, modifications, additional programming, or configurations of the foreign devices on the foreign networks.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A universal gateway device comprising:
    a first network interface circuit configured to communicate over a first network associated with an Internet of Things (IoT) management system utilizing a first communications protocol; and
    a second network interface circuit configured to communicate over a second network associated with an IoT device utilizing a second communications protocol that is different from the first communications protocol,
    wherein the first network interface circuit is configured to generate and store a virtual device, the virtual device providing a representation of one or more states of the IoT device on the first network, the virtual device configured to modify the one or more states of the virtual device based on communication over the first network via the first communications protocol and communicate the one or more states of the virtual device via the second communications protocol over the second network.

2. The device of claim 1, wherein the first network interface circuit comprises a virtual network simulation module configured to communicate with the second network interface circuit to generate the virtual device representation of the IoT device.

3. The device of claim 2, wherein the second network interface circuit is configured to:
    receive a data packet associated with the IoT device over the second communications protocol;
    store the data packet according to a data structure associated with the second communications protocol; and
    transmit the data packet to the virtual network simulation module.

4. The device of claim 3, wherein the virtual network simulation module comprises a virtual network manager, the virtual network manager configured to generate the virtual device representation based on the data packet received from the second network interface circuit.

5. The device of claim 4, wherein the virtual network manager is configured to:
    generate the virtual device corresponding to the IoT device in a virtual device table based on the data packet, the virtual device having data objects corresponding to data points of the IoT device;
    receive a data value change associated with the IoT device from the second network interface circuit; and
    update one or more of the data objects based on the data value change.

6. The device of claim 4, wherein the first network interface circuit comprises:
    a gateway executable module configured to detect the generation of the virtual device, and to expose the virtual device on the first network to appear as a field device on the first network,
    wherein the gateway executable module comprises a network layer configured to read data objects of the virtual device corresponding to data points of the IoT device to detect when the data objects are updated and to provide the updated data objects to the exposed virtual device on the first network.

7. The device of claim 5, wherein the virtual network manager is configured to initially generate the virtual device to have an offline status, and in response to receiving the data value change, the virtual network manager is configured to update the virtual device to have an online status.

8. The device of claim 5, wherein the virtual network manager is configured to identify a device type or address from the data packet, and to generate the virtual device based on the device type or address.

9. The device of claim 5, wherein the second network interface circuit is configured to:
    poll the IoT device to request data values for one or more of the data points of the IoT device;
    parse the data values to identify the data value change; and
    transmit the data value change to the virtual network manager.

10. The device of claim 1, wherein the second network is associated with a plurality of IoT devices, and the first network interface circuit is configured to generate the virtual device representation of the IoT device to include at least some data points from other devices of the plurality of IoT devices.

11. An Internet of Things (IoT) management system comprising:
    an IoT management platform configured to communicate over a first network utilizing a first communications protocol, the first network comprising one or more IoT devices associated with the first network;
    a second network comprising one or more IoT devices configured to communicate over the second network utilizing a second communications protocol that is different from the first communications protocol; and
    a universal gateway device comprising:
        a first network interface circuit configured to communicate over the first network utilizing the first communications protocol; and
        a second network interface circuit configured to communicate over the second network utilizing the second communications protocol,
        wherein the first network interface circuit is configured to generate and store a virtual device, the virtual device providing a representation of one or more states of an IoT device from among the one or more IoT devices on the first network, the virtual device configured to modify the one or more states of the virtual device based on communication over the first network via the first communications protocol and communicate the one or more states of the virtual device via the second communications protocol over the second network.

12. The system of claim 11, wherein the first network interface circuit comprises a virtual network simulation module configured to communicate with the second network interface circuit to generate the virtual device representation of the IoT device.

13. The system of claim 12, wherein the second network interface circuit is configured to:
   receive a data packet associated with the IoT device over the second communications protocol;
   store the data packet according to a data structure associated with the second communications protocol; and
   transmit the data packet to the virtual network simulation module.

14. The system of claim 13, wherein the virtual network simulation module comprises a virtual network manager, the virtual network manager configured to generate the virtual device representation based on the data packet received from the second network interface circuit.

15. The system of claim 14, wherein the virtual network manager is configured to:
   generate the virtual device corresponding to the IoT device in a virtual device table based on the data packet, the virtual device having data objects corresponding to data points of the IoT device;
   receive a data value change associated with the IoT device from the second network interface circuit; and
   update one or more of the data objects based on the data value change.

16. The system of claim 14, wherein the first network interface circuit comprises a gateway executable module configured to detect the generation of the virtual device, and to expose the virtual device on the first network to appear as a field device on the first network,
   wherein the gateway executable module comprises a network layer configured to read data objects of the virtual device corresponding to data points of the IoT device to detect when the data objects are updated and to provide the updated data objects to the exposed virtual device on the first network.

17. The system of claim 15, wherein the virtual network manager is configured to initially generate the virtual device to have an offline status, and in response to receiving the data value change, the virtual network manager is configured to update the virtual device to have an online status.

18. The system of claim 15, wherein the virtual network manager is configured to identify a device type or address from the data packet, and to generate the virtual device based on the device type or address.

19. The system of claim 15, wherein the second network interface circuit is configured to:
   poll the IoT device to request data values for one or more of the data points of the IoT device;
   parse the data values to identify the data value change; and
   transmit the data value change to the virtual network manager.

20. The system of claim 16, wherein the second network comprises a plurality of IoT devices, and the first network interface circuit is configured to generate the virtual device representation of the IoT device to include at least some data points from other devices of the plurality of IoT devices.

* * * * *